United States Patent [19]

Davis et al.

[11] Patent Number: 4,563,619
[45] Date of Patent: Jan. 7, 1986

[54] ELECTRIC POWER CONVERTER CIRCUIT

[75] Inventors: Rex M. Davis, Leicestershire; William F. Ray, Nottinghamshire, both of England

[73] Assignee: Chloride Group Public Limited Company, London, England

[21] Appl. No.: 486,954
[22] PCT Filed: Aug. 31, 1982
[86] PCT No.: PCT/GB82/00262
§ 371 Date: Apr. 6, 1983
§ 102(e) Date: Apr. 6, 1983
[87] PCT Pub. No.: WO83/00962
PCT Pub. Date: Mar. 17, 1983

[30] Foreign Application Priority Data

Sep. 8, 1981 [GB] United Kingdom ............... 8127137

[51] Int. Cl.$^4$ ........................................... H02K 29/02
[52] U.S. Cl. ......................................... 318/138; 318/254
[58] Field of Search ............... 363/138; 318/201, 810, 318/811, 138, 254, 439

[56] References Cited

U.S. PATENT DOCUMENTS

| | | | |
|---|---|---|---|
| 3,401,323 | 9/1968 | French | 318/254 |
| 3,560,820 | 2/1971 | Unnewehr | 318/138 |
| 3,585,488 | 6/1971 | Gutt | 363/135 |
| 3,743,906 | 7/1973 | Torok | 318/701 |
| 3,824,441 | 7/1974 | Heyman et al. | 363/37 |
| 3,956,678 | 5/1976 | Byrne et al. | 318/138 |
| 4,002,958 | 1/1977 | Akamatsu | 323/271 |
| 4,143,308 | 3/1979 | Deplante et al. | 318/701 |
| 4,253,053 | 2/1981 | Ray et al. | 318/701 |
| 4,360,770 | 11/1982 | Ray et al. | 318/701 |
| 4,387,326 | 6/1983 | Ray et al. | 318/701 |

FOREIGN PATENT DOCUMENTS

WO79/01132 12/1979 PCT Int'l Appl. ............... 318/701
WO79/01133 12/1979 PCT Int'l Appl. ............... 318/701

Primary Examiner—David Smith, Jr.
Attorney, Agent, or Firm—Oblon, Fisher, Spivak, McClelland & Maier

[57] ABSTRACT

A multi-phase switched variable-reluctance motor having a number of phase windings (A, B, C) each connected in series with at least one main thyristor (1,2,3,4,5,6) across a D.C. supply ($V_S$) has commutating means (23) responsive to the current in the different windings, the angular position of the rotor, the state of the main thyristors, the motor speed, and the desired operating condition, to control the firing and commutation of the main thyristors. Two modes of operation described in detail are a chopping mode in which chopping is controlled independently in two adjacent phases at the same time, and a single pulse mode with freewheeling.

10 Claims, 8 Drawing Figures

ELECTRIC POWER CONVERTER CIRCUIT

This invention relates to electric power converter circuits for variable-speed, switched reluctance motors.

Such motors, and controlled power converter circuits for them, are known, and reference may be had to the papers in I.E.E. Proceedings, Volume 127, Part 'B' No. 4, July, 1980, between pages 253 and 265 entitled "Variable Speed Switched Reluctance Motors", and I.E.E. Proc. Vol. 128, Part 'B', No. 2, March, 1981 entitled "Inverter Drive for Switched Reluctance Motor; Circuits and Component Ratings" for a summary of what may be the state of the art at the date of this application. The second of those papers is by three Authors, two of which are the Inventors in the present application.

Such motors and converters involve the use of phase windings on the stator poles, which are connected in series with thyristors across a D.C. supply, with the thyristors being switched on in synchronism with the movement of the rotor in relation to the stator to provide driving torque. The thyristors are switched off, or commutated, at appropriate instants during rotor rotation, and after commutation, current in the windings can be free-wheeled, or can be returned to the supply depending upon the circuit and the method of control.

An object of the invention is to improve the efficiency and/or economy of a multi-phase switched variable-reluctance motor having a number of phase windings each connected in series with at least one main thyristor across a D.C. supply, commutating means arranged to commutate the various thyristors, and timing means responsive to the current in the different windings and/or in response to the angular position of the rotor in particular by reducing the number of switching devices such as thyristors which are required for producing a range of possible operating conditions and by providing timing and sequencing means for activating the switching devices so as to obtain maximum benefit from the system.

The improvement in efficiency can be achieved in two related ways which constitute two different aspects of the present invention.

According to one of those aspects, for a reluctance motor where each phase winding is energised in sequence, during the transition of energisation from one phase to the next phase the timing means is arranged to independently control at least one commutation and refiring of the main thyristor of the incoming phase winding before the final refiring and commutation of the main thyristor of the outgoing phase winding.

The idea of commutating and refiring the main thyristor of a phase more than once during the period for which that phase is energised in sequence with the other phases is a method of operation known as "chopping" but in the past it has only been known to chop in one phase winding at a time unless two windings are placed in series so that the current in the first also flows through the second, the windings thereby being treated as one, and separate control of the currents in each being impossible.

The present invention in its first aspect is based on the discovery that a considerable advantage can be achieved if chopping is performed in two adjacent phases simultaneously, the chopping actions in the two phases being independent of each other. Thus, it is quite possible for two adjacent phases to produce torque simultaneously but the ideal current may be different in the two phases, and accordingly independent control of the chopping enables very efficient operation to be achieved.

According to the second aspect of the present invention, the timing means is arranged during a part of a rotor revolution, in which a rotor pole passes a stator pole, to fire at least one main thyristor to cause the phase winding on that stator pole to draw current from the supply; then to commutate at least one main thyristor and if necessary fire a free-wheeling thyristor to cause the current in that phase winding to free-wheel and then to commutate a second main thyristor or the free-wheeling thyristor to cause the current in that phase winding to flow to return energy to the supply.

This aspect of the invention relates to what may be called the "single pulse mode of operation" as distinct from the "chopping mode" described above, in which single pulse mode a thyristor is fired and commutated only once during the part of the rotor revolution in which a rotor pole passes the corresponding stator pole. In the past a thyristor was fired so that the phase winding drew energy from the supply, and then it was commutated and current in the phase winding was returned to the supply. The second aspect of the present invention involves the concept of having a free-wheeling period during which current in the phase winding can free-wheel without being returned to the supply, and that enables the current waveform of the single pulse to be controlled to be more like a desired waveform at the speed concerned.

These two aspects of the invention will not be used at the same time, but may be each used only over a part of the speed range, and indeed it is contemplated that at the top of the speed range, and possibly over more than the top half of the speed range, operation will be in the single pulse mode without free-wheeling; then during a lower part of the speed range, operation might be single pulse operation with free-wheeling in accordance with a second aspect of the present invention; then at a lower speed range operation may be in the chopping mode with only one phase being chopped at a time and finally at the bottom part of the speed range, operation might be in the chopping mode with independent simultaneous chopping in two adjacent phases at one time in accordance with the first aspect of the present invention.

In some embodiments of the invention, half the main thyristors are connected between a main winding and the positive side of the supply, and the remainder are connected between a main winding and the negative side of the supply.

Thus, it is possible where there is only a two-point D.C. supply, for each phase winding to be connected at one end through one main thyristor to the positive side of the supply, and at the other end to another main thyristor to the negative side of the supply. Again in an arrangement in which pairs of phase windings have one end connected together, one of those phase windings may be connected at the other end through a main thyristor to the positive side of the supply, and the other of those windings may be connected at its other end through another main thyristor to the negative side of the supply.

In either of those arrangements it is convenient if the commutating means is in two portions, each capable of providing a commutating voltage for half the main thyristors. The two portions may be independent of each other, but the number of components can be reduced, for example to have a single thyristor or transistor if the two portions are alternately of the right polarity for commutating their main thyristors, the polarity being reversed whenever a commutation is effected. In the case of a phase winding connected between respective main thyristors to the positive and negative sides of the supply, it will always be possible to commutate one or other of those main thyristors because one or other portion of the commutating means will have the right polarity for that purpose.

Commutation of a thyristor in the one half of the main thyristors would of course commutate any other thyristor in that half which was conducting, but if it is desired not to commutate such other main thyristor it can be promptly refired.

The timing means will be likely to include a logic circuit having as inputs, signals representing a rotor angle, and the currents in the various windings, and probably also the state whether fired or commutated of the various main thyristors, and the logic circuit would be programmed to fire or commutate thyristors accordingly in dependence upon the particular type of operation necessary at the speed concerned.

Further features and details of the invention will be apparent from the following description of certain modes of operation and specific embodiments of the invention that will be given by way of example with reference to the accompanying drawings, in which.

Figure 1:
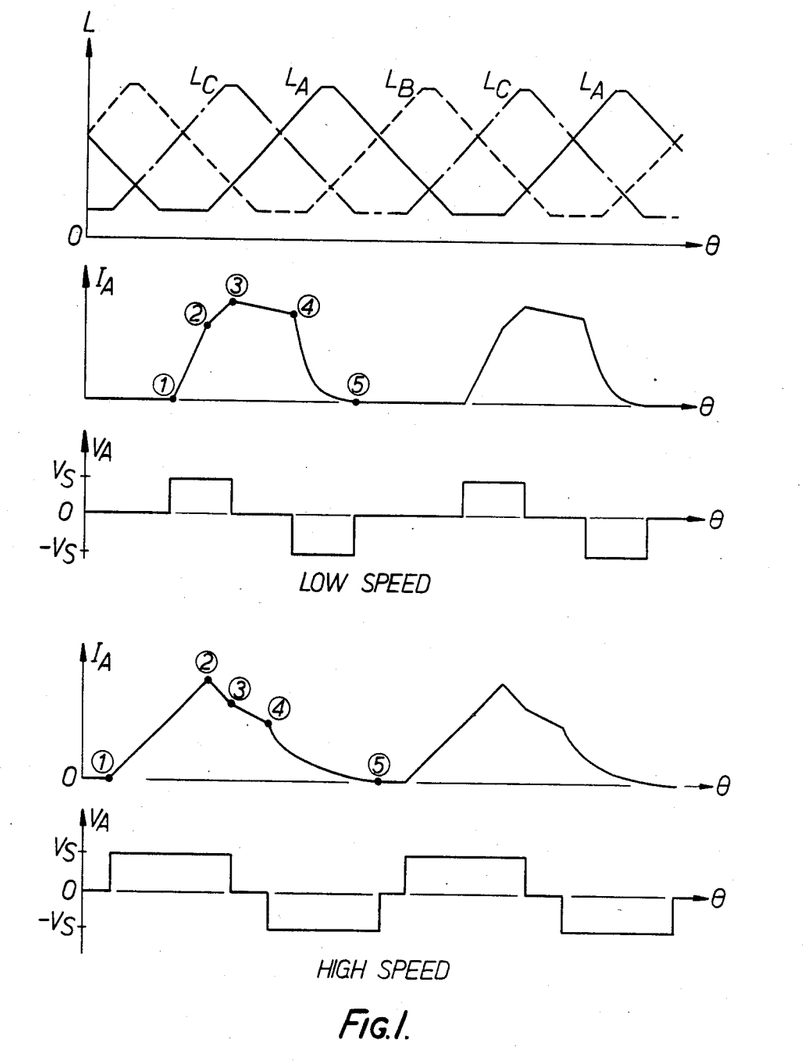
FIGS. 1–4 and 7 are graphs showing waveforms

As is well known the inductance 'L' of each phase winding of a variable reluctance motor having several phases varies with rotor angle $\theta$ as shown in FIG. 1. Motoring torque is produced if current exists in a given winding during the period for which $dL/d\theta$ is positive. The objection of torque production is therefore to maintain current in each phase during this period.

The rate of change of current in a winding at any instant is given by $$\frac{di}{d\theta} = \frac{V - E - Ri}{\omega L}$$

where 'V' is the voltage applied to the windings 'L' is the winding inductance at that instant and may be a function of both current i and rotor position $\theta$, R is the winding resistance, E is the winding back emf where $E = i\, dL/dt$ and $\omega$ is the angular speed. The voltage drop Ri due to winding resistance is generally much smaller than V or E.

FIG. 1 also shows current pulses applicable for part of the speed range. When operating with these pulses the system is said to be operating in the single pulse mode.

For the portion between points 1 and 3, $V = V_s$ (the supply voltage), and energy flows from the supply. It is beneficial to commence the winding energisation (point 1) in advance of the rising inductance period for which $E = 0$; and furthermore at the higher speeds the current i may decrease following the commencement of the rising inductance period of point 2 if $E > V_s$. These desirable features have already been disclosed in British Patent Specification No. 1591346 (Case 236).

During the portion between points 1 and 3 the energy from the supply is partly stored in the magnetic field of the motor and partly converted to mechanical energy. During this portion the phase is in what may be termined the "energy supply mode".

In accordance with the second aspect of the present invention, for the portion between points 3 and 4, $V = 0$ and the current decays under the influence of the back emf E. During this portion no energy flows to or from the supply and the phase is in what may be termed the "freewheeling" mode. Energy stored in the magnetic field of the motor is converted to mechanical energy.

For the portion between points 4 and 5, $V = -V_s$ and the current decays under the combined influence of the back emf E and the reverse supply voltage, $-V_s$. During this portion the energy stored in the magnetic field of the motor is partially converted to mechanical energy and partially returned to the supply. During this portion the phase is in what may be termed the "energy return" mode. It will be seen that the rate of decay of current between points 4 and 5, the energy return portion, is significantly greater than between points 3 and 4, the freewheeling portion, and that the insertion of a freewheeling portion between the energy supply and energy return portions greatly facilitates the maintenance of current during the rising inductance period. Furthermore, the insertion of the said freewheeling portion reduces the amount of stored energy circulating between the supply and the magnetic field as a proportion of the converted mechanical energy, and therefore has beneficial effects in reducing the size and cost of any filter capacitance associated with the supply.

At low speeds the single pulse mode of operation is not suitable, due to the fact that $di/d\theta$ (see equation (1)) is too great to allow current to be maintained over a sufficient angular period with only one portion each of energy supply, freewheel and energy return.

Figure 2:
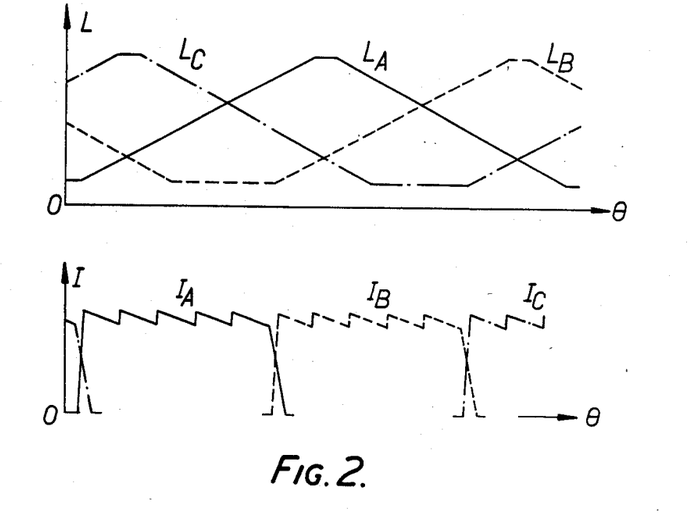

FIG. 2 shows current waveforms suitable for operation at low speeds in which the winding current is built up to a higher threshold value by making $V = V_s$, the energy supply portion, the current is then allowed to freewheel with $V = 0$ until it drops to some lower threshold, it is then built up again to the higher threshold by making $V = V_s$ as before and this sequence is repeated over a sufficient angular period until the next phase is at the correct state for torque production. The current in the outgoing phase is then forced to subside by making $V = -V_s$ the energy return portion and current is built up in the incoming phase to repeat the procedure. The process of varying the current between an upper and lower threshold is said to be operating in the chopping mode.

Figure 3:
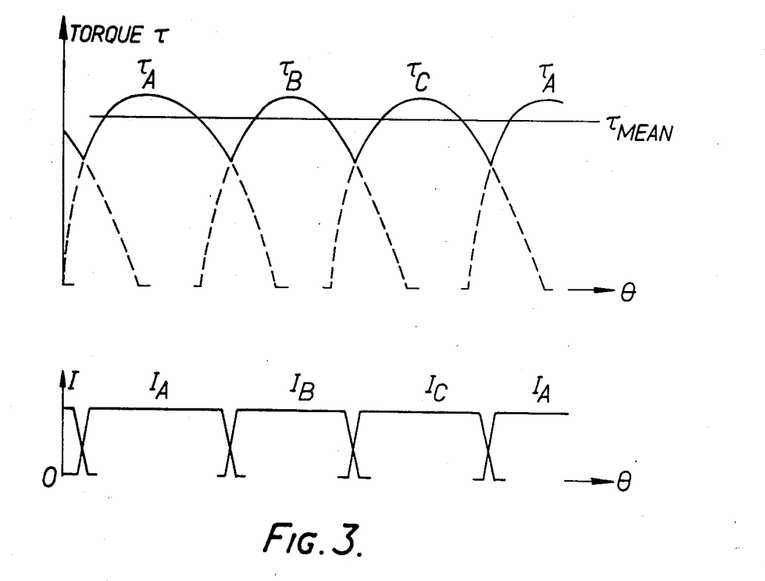

It will be seen from FIG. 2 that the above mentioned chopping sequence is repeated for each phase in turn and only one phase at a time produces torque. However, due to the non-linear magnetic behaviour of the motor, the torque produced by a given current in a phase winding decreases as the inductance approaches its maximum value. The torque produced by rated current in each motor winding is illustrated in FIG. 3. It will be seen that for running at low speed with rated current the torque varies with rotor angle, and, taking the mean torque to be representative of rated torque, there are certain rotor positions for which rated torque cannot be achieved, which may cause starting difficulties.

Figure 4:
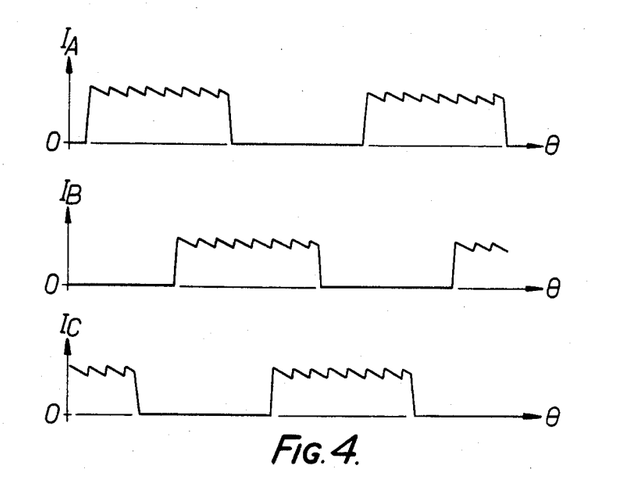

In order to produce a more constant torque when running at low speed, and to eliminate the torque deficiencies at certain rotor angles, it is advantageous in accordance with the first aspect of the invention for the chopping sequence of the outgoing phase to overlap that of the incoming phase as shown in FIG. 4 so that torque may be produced by two phases simultaneously over a significant angular period. This means that the electric drive system must be capable of controlling the winding current in two phases simultaneously by appropriate sequential firing of the main and commutating thyristors of both phases. The process of varying the current between upper and lower thresholds in two phases simultaneously may be termed operating in the overlapped chopping mode.

The process described above may similarly be extended to maintain and control the current in three or more phases simultaneously should this be desirable.

It is possible that an instant of firing or commutating a main thyristor in the chopping mode will be determined by rotor angle instead of winding current and that it will be determined by the value of winding current in the single pulse mode.

Figure 5:
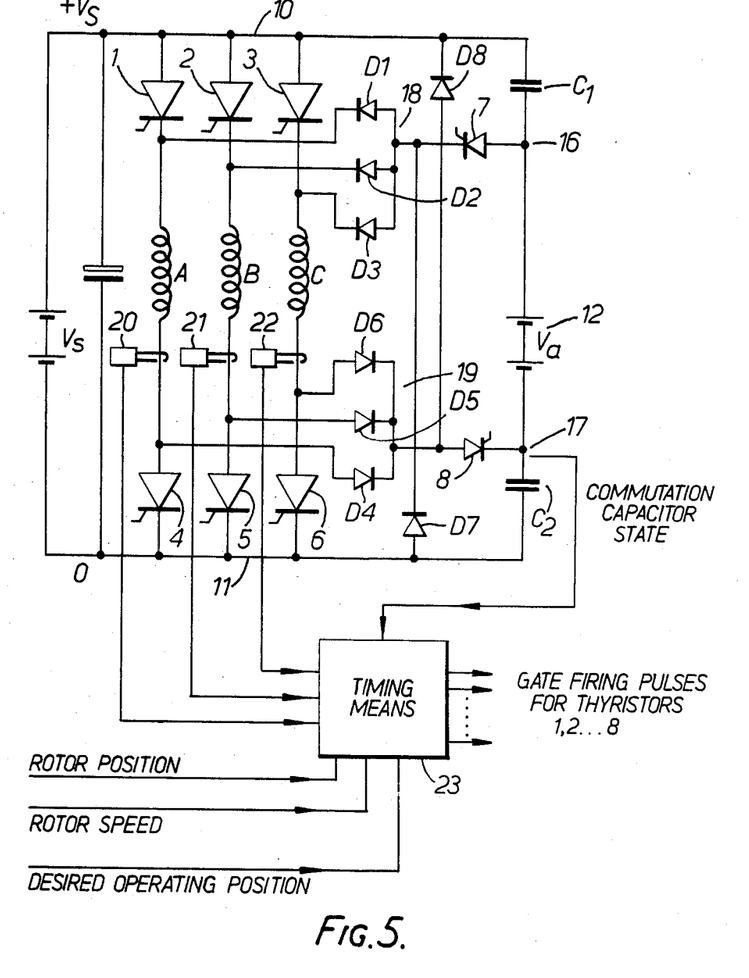
FIG. 5 is a circuit diagram of the switching circuit of a three phase variable reluctance motor system which can be operated in accordance with the invention.

The invention is shown in FIG. 5 as applied to a three-phase motor, each phase having a single main winding A, B, or C. Each main winding has one end connected through a respective one of three positive main thyristors 1, 2, and 3 to the positive terminal 10 of a main D.V. supply $V_S$. At its other end, each winding is connected through a respective one of three negative main thyristors 4, 5 and 6 to the negative terminal 11 of the main supply.

An auxiliary supply 12 is provided for commutation of the main thyristors. The auxiliary supply has a positive terminal 16 connected through a capacitor C1 to the positive main supply terminal 10, and also connected to the anode of a positive commutating thyristor 7, while it has a negative terminal 17 connected through a capacitor C2 to the negative main supply terminal 11 and also connected to the cathode of a negative commutating thyristor 8.

The auxiliary supply may comprise a battery as shown, or it may take other forms, for example, it may comprise a relatively large capacitor connected to each terminal of the main supply through an inductor, or connected to an isolating DC-DC converter fed from the main supply, or to a rectifier fed from an A.C. mains supply.

The cathode of the positive commutating thyristor 7 is connected to a bus bar 18, which in turn is connected through each of three positive diodes D1, D2, and D3, to the cathodes of the positive main thyristors 1, 2 and 3, and is also connected through a negative diode D7 to the negative main supply terminal 11.

Similarly, the anode of the negative commutating thyristor 8 is connected to a bus bar 19, which in turn is connected through negative diodes D4, D5, and D6 to respective anodes of the negative main thyristors 4, 5 and 6, and through a positive energy return diode D8 to the positive main supply terminal.

In order to protect the main and commutating thyristors against excessive rate of change of current at turn-on the bus bars 18 and 19 may be connected through inductors to the commutating thyristors 7 and 8 and the diodes D7 and D8. Such inductors can be arranged in various known ways, and do not affect the present invention, and for the sake of simplicity have not been included in FIG. 5.

Timing means 23 is provided for firing the main thyristors 1, 2 and 3, 4, 5 and 6, and the commutating thyristors 7 and 8 in accordance with conditions. The timing means is supplied with input signals representing winding currents (from current transducers 20, 21 and 22) and rotor angular position and speed, and commutation capacitor state, and input signals indicating the desired operating condition.

The switching off, or commutation, of the main positive thyristors 1, 2 and 3, is under the control of the positive commutating thyristor 7, whilst that of the main negative thyristors 4, 5 and 6 is under the control of the negative commutating thyristor 8. The arrangement of the commutating circuit comprising the capacitors C1 and C2, and the auxiliary supply 12 ensures that at all times the capacitors are charged so as to enable either the positive commutating thyristor 7, or the negative commutating thyristor 8 to commutate either the positive main thyristors, or the negative main thyristors. Thus, the positive 16 and negative 17 terminals of the supply 12 that is to say the anode of the positive commutating thyristor 7, and the cathode of the negative commutating thyristor 8 are generally at a potential VS+VA and VS (VS being the positive potential of the main supply, and VA being the potential difference of the auxiliary supply) or 0 and −VA respectively. In the former case the commutation circuit is termed to be in its positive state and in the latter case its negative state. Thus, assuming that the potential of the positive terminal of the auxiliary supply is VS+VA, and that both main thyristors 1 and 4 of phase 'A' are conducting, so that the winding of phase 'A' is directly connected across the main supply, then if the commutating thyristor 7 is fired, current will flow from the capacitors through the commutating thyristor 7, the diode D1 and the winding A, and the main thyristor 4 to the negative terminal 11 of the main supply. This current by-passes the thyristor 1 which will accordingly be commutated. The commutating current to the commutating thyristor 7 flows directly from the capacitor C1 connected to the positive main supply terminal, and also through the auxiliary supply from the capacitor C2 connected to the negative main supply terminal. Since the potential difference of the auxiliary supply remains substantially constant, the potentials of the anode of the positive commutating thyristor 7 and the cathode of the negative commutating thyristor 8 will move in unison, for example between +VS +VA and VS respectively, and 0 and −VA respectively.

From what has been said, it will be appreciated that firing the positive commutating thyristor 7 will commutate any of the positive main thyristors 1, 2 and 3, that happens to be conducting whilst firing the negative commutating thyristor 8 will commutate any one of the negative main thyristors 4, 5 and 6 that happens to be conducting. If both main thyristors of a phase are conducting, that phase will be operating in the energy supply mode. If neither main thyristor of a phase is conducting, and there is current in the winding of the phase, it will be in the energy return mode. If one main thyristor, but not the other of a phase is conducting, any current will be free-wheeling through the main thyristor that is conducting.

It will be appreciated that if positive and negative main thyristors are commutated alternately, the arrangement shown in FIG. 5 does not require any separate resonant reversal circuit in order to charge the capacitor in the correct direction for the next commutation.

When the switching circuit of FIG. 5 is first connection to the main supply of potential VS the voltages at points 16 and 17 will be approximately (VS+VA)/2 and (VS−VA)/2 respectively, where VA is the potential of the auxiliary supply. If the auxiliary supply 12 is a capacitor connected via inductors to the main supply terminals 10 and 11, the initial voltages at points 16 and 17 will be VS and 0 respectively.

To prime the commutation circuit, one main thyristor of the first phase to be energised, say thyristor 1, and the commutating thyristor 8 are fired. Current then flows through the thyristor 1, the winding of phase A, the diode D4 and the thyristor 8 into the capacitor C2, causing the potential at the point 17 to rise until it reaches VS whereupon the diode D8 commences conduction and the current in phase A free-wheels via the main thyristor 1 and diodes D4 and D8. Thyristor 4 is now fired leaving the commutating circuit in its positive state with phase A in its energy supply mode.

Thus, for example, for single pulse operation, which will prevail over only a portion of the speed range including the high speed portion, the operation may be as follows. At an appropriate moment, for example at a predetermined angular position of the rotor, both the positive and negative main thyristors of a phase, say phase 'A', will be fired, and the phase winding 'A' will be directly connected across the main supply, so that the current in it will build up steadily in the energy supply mode.

At a later appropriate moment, for example, at a further predetermined angular position of the rotor, assuming that the commutating circuit is in its positive state, the positive commutating thyristor 7 is fired, and current from the capacitors flows through it, and through the diode 1, and thence through the phase winding 'A' and main negative thyristor 4 to the negative supply terminal. As indicated above, this current by-passes the main positive thyristor 1 which is accordingly commutated. (If the commutating circuit were to be in the negative state then the negative commutating thyristor 8 would be fired so as to commutate thyristor 4 and the process would be of opposite polarity to that described above).

On commutating thyristor 1 current flows through the positive commutating diode D1 from the capacitors C1 and C2 while the potential at points 16 and 17 falls until the commutating circuit reaches its negative state. The current then transfers from thyristor 7 to diode D7 and the thyristor 7, being self-commutated, turns off. Free-wheeling current can then continue to flow from the main phase winding 'A' through the negative main thyristor 4, through the diodes D7 and D1 back to the winding 'A'.

After an appropriate interval (or at an appropriate angular position of the rotor), the negative commutating thyristor 8 is fired and the free-wheeling current in the winding 'A' flows through the diode D4 and the negative commutating thyristor 8 to the commutating circuit. This by-passes the negative main thyristor 4 which accordingly is commutated. The winding current now flows through D4 and thyristor 8 to the capacitors C1 and C2 while the potential of points 16 and 17 rises until the commutating circuit reaches its positive state. The current then transfers from thyristor 8 to diode D8 and thyristor 8 being self commutated, turns off.

The current now flows from the negative supply terminal 11 through D7, D1, through the phase A winding, and through D4, D8 to the positive supply terminal 10. Accordingly any such current will be returning energy to the main supply, and the potential difference of the latter will slow down the current in the winding at a rate considerably greater than will occur with free-wheeling current. The single pulse operation of the remaining phases occurs in exactly the same way as has been described in connection with phase 'A'.

At low speeds, and particularly at rest, the current cannot be satisfactorily controlled in accordance simply with rotor angular positions, and it is known to adopt a "Chopping Mode" as has been previously described.

Thus, in employing the circuit shown in FIG. 5 for a chopping mode, both main thyristors of one phase, say phase 'A', are fired so as to connect the winding across the main supply. The current in the winding will accordingly build up until it reaches an upper threshold value. Assuming the commutation circuit is in its positive state, the positive commutating thyristor 7 is then fired to commutate the positive main thyristor 1 of phase 'A' leaving a free-wheeling current to flow from the winding of phase 'A' through the main negative thyristor 4 and through diodes D7 and D1.

The current accordingly falls gradually, and when it reaches a lower threshold, the main positive thyristor 1 of phase 'A' is refired, so as again to connect the phase 'A' across the main supply.

After a short time the current will have built up again to the upper threshold, but it will be necessary to disconnect the winding 'A' from the main supply. The capacitors are now in a negative state and are unable to commutate the positive main thyristors. This does not matter since free-wheeling current can be set up by commutating the negative main thyristors 4, 5 and 6. Accordingly, the negative commutating thyristor 8 is fired by-passing the negative main thyristor 4, and commutating it, so that free-wheeling current can flow from the phase winding 'A' through diodes D4 and D8, thence through the main positive thyristor 1 back to the winding 'A'.

The chopping may be continued as required, the periods of free-wheeling current flowing alternately through the positive main thyristor and through the negative main thyristor.

At a desired moment, (or angular position of the rotor), the main thyristor that is not conducting will not be refired, but the main thyristor that is conducting will be commutated by firing the appropriate commutating thyristor 7 or 8. This will initiate the energy return mode and the current will fall rapidly to zero.

A further feature of the circuit shown in FIG. 5 is that it enables the winding current in two separate phases to be controlled at the same time by the chopping process previously described for a singlephase. As described previously, if the incoming phase, for example 'B' can be supplied with current at the same time as the outgoing phase, for example, phase 'A', it can be employed to contribute some additional torque to the falling off torque of phase 'A'. This may be of value in ensuring that the available torque never falls below a desired value.

The circuit shown in FIG. 5 only employs a single commutation circuit to commutate each and all of the main thyristors. This has the advantage of reducing the number of components required for commutation and thereby reducing the cost and size of the system. In the case of known circuits, the availability of only a single commutation circuit makes the task of commutating the main thyristors in two phases at the desired instants of time for the required overlapped chopping operation very difficult, as the commutation circuit may be of the wrong polarity at the required instant of commutation and for which insufficient time may exist for the resonant reversal of the commutation circuit polarity.

The circuit shown in FIG. 5, has the ability to perform the commutation of one or other main thyristor of any phase at any time regardless of the commutation circuit polarity and without the necessity of resonant reversal, and it is this feature which enables the circuit to be used for controlling the current in the chopping mode in two phases at the same time.

Figure 6:
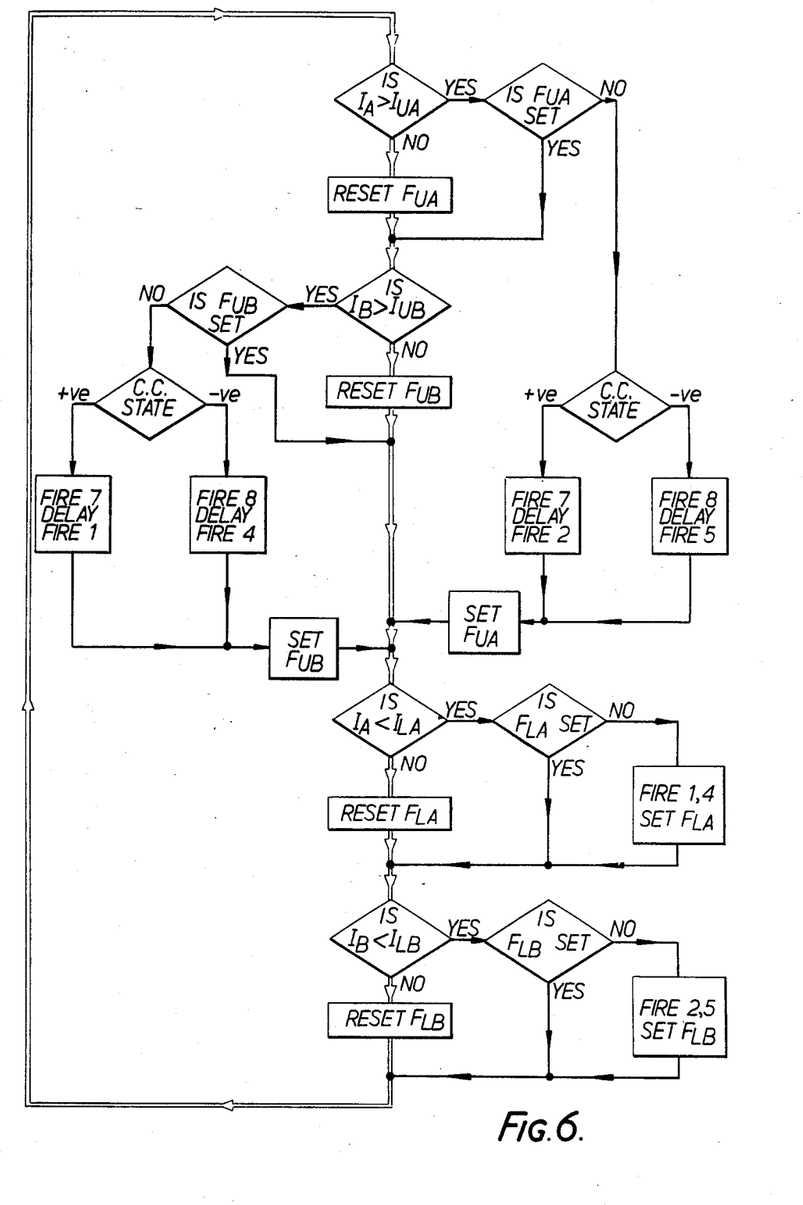
FIG. 6 is a flow diagram, illustrating various modes of operation.

Since the circuit of FIG. 5 is extremely flexible in its sequential operation, this operation is best defined in terms of a simple flow chart illustrating the sequence of firing decisions as shown in FIG. 6, which, for example, described chopping in phases A and B. $I_A$ represents the value of the winding current for phase A and $I_{UA}$ and $I_{LA}$ represent the previously mentioned upper and lower threshold values between which the current is to be cycled. $I_B$, $I_{UB}$ and $I_{LB}$ are the corresponding values for phase B. "CC state" denotes the state of the commutation circuit.

The flow chart operator utilises two control logic flags $F_{UA}$ $F_{UB}$ each of which may take either of two states "SET" or "RESET" and which are used to temporarily register that a main thyristor commutation has taken place in phases A and/or B. These flags are to prevent unnecessary commutations as described below. The flow chart operation also utilises a further two flags $F_{LA}$ and $F_{LB}$ which are used to temporarily register that a main thyristor firing has taken place in phases B and/or A to prevent unnecessary repetition of firing.

It will be appreciated that the flow chart of FIG. 6 only forms a part of the over-all strategy of the reluctance motor drive system, that is the part concerned with sequencing the firing of the main and commutating thyristors for operation in the overlapped chopping mode. This sequencing will now be further described with reference to FIG. 6 by way of a specific example illustrated by the current waveforms of FIG. 7.

Suppose that phase A has been operating in its chopping mode with the other phases unenergised when at the rotor angle corresponding to point 1 (FIG. 7) it is desirable to commence chopping simultaneously in phase B. Furthermore suppose at this point that A is in its free-wheeling mode with thyristor 4 off and thyristor 1 conducting and the commutating circuit state is positive.

The flow chart of FIG. 6 now becomes operative and it will be seen that provided the currents $I_A$ and $I_B$ lie within their respective thresholds (i.e., $I_{UA} > I_A > I_{LA}$ and $I_{UB} > I_B > I_{LB}$) the control loop cycle around the double line path shown with all four flags RESET. However, at point 1 (FIG. 7) $I_B$ is zero and below its desired lower threshold and hence thyristors 2 and 5 will be fired, thereby putting phase B in its energy supply mode, and flag $F_{LB}$ will be set.

Figure 7:
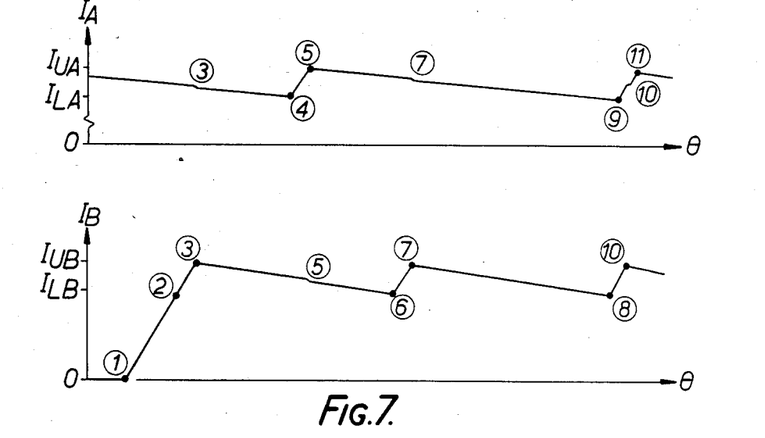

At point 2, $I_B$ has exceeded its lower threshold value $I_{LB}$ and $F_{LB}$ will be reset. The existance of flag $F_{LB}$ prevents the repetitive firing of thyristors 2 and 5 whilst $I_B$ is increasing from zero to $I_{LB}$.

At point 3, $I_B$ has reached its upper threshold value $I_{UB}$ and with the commutating capacitor state positive the positive commutation thyristor 7 is fired thereby commutating thyristors 1 and 2. As a result the commutation circuit changes state to negative and phase B enters its free-wheeling mode, with thyristor 5 on and thyristor 2 off. After a time delay, sufficient for, or equivalent to, the change in state of the commutation circuit, thyristor 1 is fired so that phase A reverts to its free-wheeling mode. Flag $F_{UB}$ is set so that no further commutations take place due to $I_B > I_{UB}$. With phase B in its free-wheeling mode $I_B$ falls until $I_B < I_{UB}$ whereupon flag $F_{UB}$ is reset.

Suppose at point 4 $I_A$ reaches its lower threshold value $I_{LA}$. Thyristors 1 and 4 are fired so that phase A enters its energy supply mode and current rapidly builds up until at point 5 $I_A$ reaches its upper threshold $I_{UA}$.

Since the commutation circuit state is now negative the negative commutation thyristor 8 is fired, commutating thyristors 4 and 5 changing the state of the commutation circuit and putting phase A into its free-wheeling mode again. Thyristor 5 is refired to keep phase B in its free-wheeling mode.

At point 6 $I_B$ falls to $I_{LB}$ and thyristors 2 and 5 are fired to put phase B in its energy supply mode followed by the firing of thyristor 7 at point 7 when $I_B$ reaches $I_{UB}$.

Due to the different inductances of phases A and B at a given rotor angle, the rate of change of current in the two phases when free-wheeling (or for energy supply) may be dissimilar. Suppose for example, that the rate of decay of current in phase B is greater and that phase B reaches its lower threshold $I_{LB}$ at point 8 just before $I_A$ reaches $I_{LA}$ at point 9. Thyristors 2 and 5 are fired at point 8 followed by 1 and 4 at point 9 so that both phases are in their energy supply modes.

At point 10 $I_B$ reaches its upper threshold $I_{UB}$ and since the commutation circuit state is now negative following the previous commutation at point 7, thyristor 8 is fired, commutating thyristors 4 and 5. The commutation circuit changes state to positive and thyristor 4 is refired leaving phase A in its energy supply state and phase B free-wheeling with thyristor 5 off and 2 on.

At point 11 $I_A$ reaches $I_{UA}$ and since the commutation state is now positive thyristor 7 is fired commutating thyristors 1 and 2. The commutation circuit changes state to negative and thyristor 2 is refired leaving both phases in their free-wheeling modes.

The upper and lower threshold limits for each phase respectively may not necessarily be the same at a given rotor angle and it may be advantageous to vary these threshold limits for each phase as the rotor angle changes.

It will be appreciated that the order of main thyristor and commutating thyristor firings will vary between the two phases and not necessarily follow a strict sequence as the rotor angle changes and the rates of change of current for the two phases vary. However, it has been demonstrated that the circuit of FIG. 5 has the flexibility of operating with the varying conditions and of controlling the current in the two phases.

The process of overlapped chopping is finally terminated at a predetermined moment or rotor angle by disabling the refiring of thyristors 1 and 2 so that for phase A the main thyristor that is not conducting will not be refired, but instead the main thyristor that is conducting will be commutated by firing the appropriate commutating thyristor 7 or 8. This will initiate an energy return mode for phase A and the current $I_A$ will fall rapidly to zero. Chopping will then continue in phase B alone until at a suitable predetermined moment or rotor angle phase C is simultaneously energised to give overlapped chopping in phases B and C according to the same pattern as described above for phases A and B.

It will be appreciated that as described, the circuit shown in FIG. 5 is extremely versatile as well as being economical. Thus, it will be seen that it employs only eight thyristors, whereas in a known circuit employing free-wheeling modes, and using resonant reversal circuits, there are either fourteen or eighteen thyristors. It will however be appreciated that the invention is not limited to the particular circuit shown in FIG. 5.

The circuit of FIG. 5, for which the commutation circuit can only commutate either the top thyristors 1, 2 and 3 or the bottom thyristors 4, 5 and 6 at a given instant of time depending on the state of the commutation capacitors as described above, represents the most difficult to control from the viewpoint of the timing means as is indicated by flow-chart of FIG. 6. If a different commutation circuit is used whereby thyristors 1, 2 and 3 may be commutated independently of 4, 5 and 6 and if appropriate at the same instant of time, then the sophistication of control demanded by the timing means in order to fulfill the two aspects of the invention is significantly eased.

Figure 8:
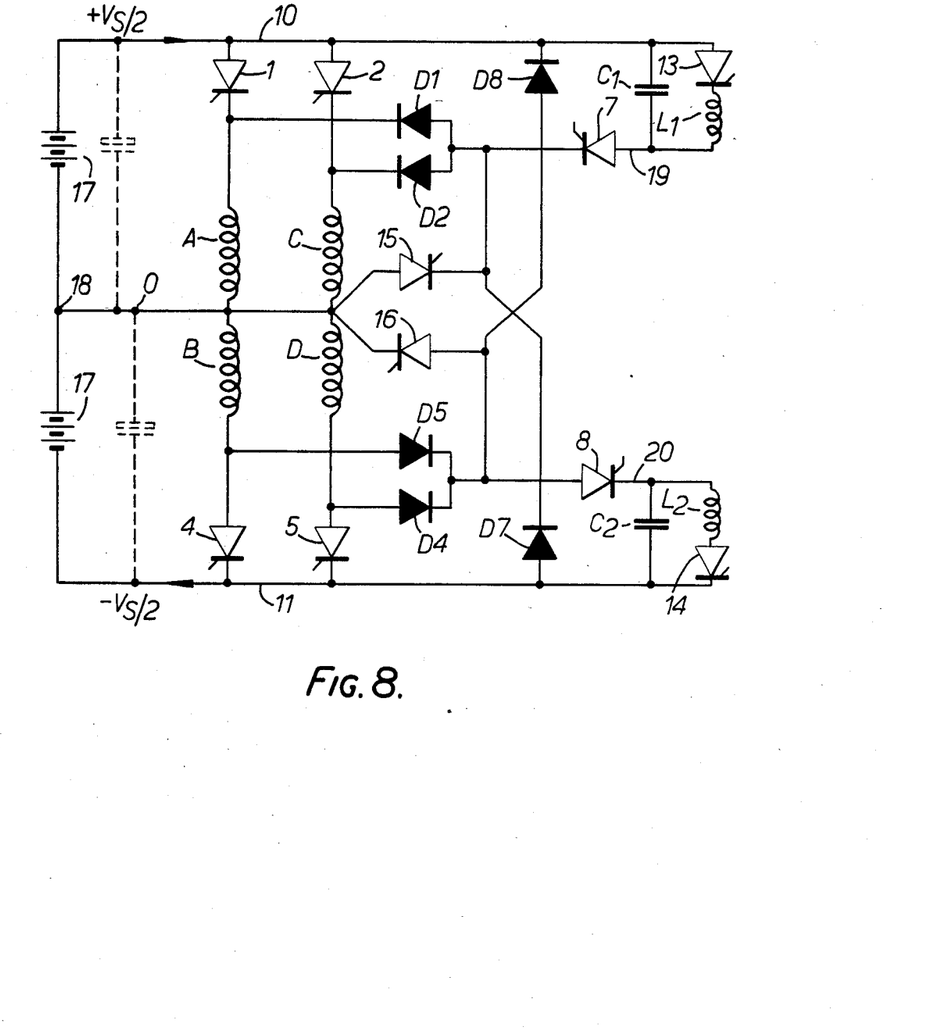
FIG. 8 is a circuit diagram similar to FIG. 5 of a further embodiment applied to a four phase motor of 'H' layout.

This is illustrated by another circuit shown in FIG. 8, in which the invention is shown as applied to what may be termed an 'H' arrangement. Such an arrangement may be applied to a system in which a centre tapped supply is acceptable. The arrangement is similar to that of FIG. 5 and corresponding components bear the same references.

Thus, one end of each of two phase windings A and C is connected to the centre tapping 18 of a supply 17 while the other ends are connected, each through one of two main thyristors 1 and 2, to the positive terminal 10 of the supply. Similarly, one end of each of the phase windings B and D is connected to the centre tapping while the other end is connected through one of two further main thyristors 4 and 5, to the negative terminal 11 of the supply.

The junction of each winding A and C with its main thyristor is connected through one of two diodes D1,D2, and a diode D7 to the negative supply terminal. Similarly, the junctions of the windings B and D to their main thyristors are connected through diodes D4, D5 and D8 to the positive supply terminal. The junction of the diode D7 and the diodes D1 and D2 is connected to the cathode of a commutation thyristor 7, and a commutation capacitor $C_1$ is connected between the anode of 7 and the positive supply terminal 10. Similarly, the junction of diode D8 and the diodes D4 and D5 is connected to the anode of a commutation thyristor 8, and a commutation capacitor $C_2$ is connected between the cathode of 8 and the negative supply terminal 11.

A resonant reversal circuit comprising a thyristor 13 and inductor $L_1$ is connected across the capacitor $C_1$ and a further resonant reversal circuit comprising thyristor 14 and inductor $L_2$ is connected across $C_2$. A free-wheeling thyristor 15 is connected with its anode to the supply mid-terminal 18 and its cathode to the cathode of thyristor 7, and a further free-wheeling thyristor 16 is connected with its cathode to the mid terminal 18 and its anode to the anode of thyristor 8.

For convenience the supply potentials are taken to be zero at the mid-tapping 18, $VS/2$ at the positive terminal 10 and $-VS/2$ at the negative terminal 11. Let the anode of thyristor 7 be point 19 and the cathode of 8 be point 20.

The capacitor is initially primed by firing 7 so that $C_1$ charges through windings A and C, the potential at 19 falling to a negative value under the inductive effect of the windings. After 7 has turned off, thyristor 13 is fired, resonantly reversing the charge on $C_1$ through $L_1$ so that the potential at 19 becomes significantly more positive than $+VS/2$. $C_2$ is similarly primed by firing 8 followed by 14 leaving the potential at 20 significantly more negative than $-VS/2$.

Each time it is required to commutate any of thyristors 1, 2 and 15, thyristor 7 is fired and the current in windings A and/or C previously flowing in 1, 2 or 15 flows instead through $C_1$ and 7 thereby discharging $C_1$. The potential at 19 falls until it reaches 31 $VS/2$ whereupon diode $D_7$ takes over the winding current. After an appropriate time for 7 to turn off, thyristor 13 is fired to resonantly reverse the polarity of $C_1$ such that the potential at 19 approaches $+3VS/2$.

Similarly thyristors 4, 5 and 16 may be commutated by firing 8 whereupon the potential at 20 rises to $+VS/2$ and diode $D_8$ conducts. Thyristor 14 is then fired to resonantly reverse the polarity of $C_1$ such that the potential at 19 approaches $-3VS/2$.

Each time a commutation takes place in either circuit, a resonant reversal is initiated as described above to return the polarity of the respective commutation capacitor to the state required for a further commutation.

The execution of the two aspects of the invention by appropriate timing means is now described.

For operation in the single pulse mode, at an appropriate rotor angle phase A is placed in its energy supply mode by firing 1. At a further appropriate rotor angle thyristor 1 is commutated as described above and phase A may be left in the energy return mode wth current flowing in $D_7$ and $D_1$ until the current reaches zero. Alternatively after a relatively short time, the reason for which is described below, thyristor 15 may be fired so that phase A enters its free-wheeling mode. This may be terminated at a further appropriate rotor angle by commutating 15 whereupon phase A is left in its energy return mode until the current falls to zero.

Phases B,C and D may be similarly energised in sequence. Phase B for example being under the control of the main thyristor 4, free-wheeling thyristor 16 and return energy diode $D_8$.

For operation in the chopping mode for phase A at an appropriate rotor angle thyristor 1 is fired and the current $I_A$ in A is allowed to increase until it reaches its upper limit $I_{UA}$. Thyristor 1 is then commutated and the current $I_A$ transfers to diodes $D_7$ and $D_1$. During the commutation of 1 when thyristor 7 is fired a small pulse of current is injected into phase C which subsequently transfers to diodes $D_7$ and $D_2$.

Both windings A and C will now experience a reverse voltage and a relatively short time is allowed not only to enable thyristor 7 to turn off but also to allow the small current injected into C to fall to zero. Thyristor 15 is now fired so that $I_A$ transfers from diode $D_7$ and free-wheels through 15 and diode $D_1$.

Since phase C is in antiphase to phase A, where current to exist in C during free-wheeling the forward emf in C (as opposed to back emf in A) due to the rotation of the motor may cause the current in C to build up thereby creating a counter-productive torque.

The current $I_A$ free-wheels until it reaches its lower limits $I_{LA}$ whereupon thyristor 1 is refired and energy supplied to A so that the current increases to $I_{UA}$. Thyristor 1 is then commutated and the process of free-wheeling and energy supply is repeated until at some appropriate rotor angle it is required to de-energise phase A whereupon thyristor 1 (or 15 as the case may be) is commutated and the currrent $I_A$ allowed to decay to zero whilst flowing through $D_1$ and $D_7$.

Operation in the chopping mode for phase B follows a similar sequence where thyristor 4 is fired to supply energy to B and when $I_B$ reaches $I_{UB}$ 4 is commutated and thyristor 16 fired to give free-wheeling until $I_B$ falls to $I_{LB}$, the process being repeated throughout the angle of rotation for which chopping in B is required until finally 4 (or 16) is commutated and the current $I_B$ allowed to decay to zero whilst flowing in $D_4$ and $D_8$.

Since there are effectively two separate commutation circuits, the first comprising thyristors 7 and 13, capacitor $C_1$ and inductor $L_1$ for commutating thyristors 1,2 and 15, the second comprising 8, 14 $C_2$ and $L_2$ for commutating thyristors 4,5 and 16, and since these circuits operate independently, there is no difficulty in shopping for example in phase A between current limits $I_{UA}$ and $I_{LA}$ at the same time as chopping inphase B between current limits $I_{UB}$ and $I_{LB}$.

Hence the timing means are sufficient for independent control of chopping in the outgoing phase A simultaneously with chopping in the incoming phase B in accordance with the first aspect of the invention. There will be timing means similar to means 23 in FIG. 5, but there need not be an input from the capacitors $C_1$ and $C_2$. Current transducers (not shown) will provide inputs representing the currents in the four phase windings.

We claim:

1. A multi-phase switched variable reluctance motor having a number of phase windings each connected in series with at least one main thyristor across a D.C. supply, and arranged to be energised in sequence by pulses of energy from the supply, commutating means arranged to commutate the various thyristors, and timing means responsive to the current in the different windings, and/or in response to the angular position of the rotor, for providing signals to commutate and to refire the main thyristor of one phase winding at least once in each pulse of energy, and for providing signals to commutate and to re-fire the main thyristor of the next phase winding in the sequence before the final refiring and commutation of the main thyristor of the said one phase winding.

2. A motor as claimed in claim 1 in which the commutating means and the timing means are arranged responsive to the current in the different windings and in response to the angular position of the rotor during a part of a rotor revolution in which a rotor pole passes a stator pole, to fire at least one main thyristor to cause the phase winding on that stator pole to draw current from the supply; then to commutate at least one main thyristor; then to fire a free-wheeling thyristor to cause the current in that phase winding to free-wheel; and then to commutate one of a second main thyristor and the free-wheeling thyristor to cause the current in that phase to flow to return energy to the supply.

3. A motor as claimed in claim 1 in which half the main thyristors are connected between a main winding and the positive side of the supply and the remainder are connected between a main winding and the negative side of the supply.

4. A motor as claimed in claim 3 including means for providing the commutating means with two non-transient states, in one of which a commutating voltage has a polarity appropriate for commutating one half of the main thyristors and the other of which provides a commutating voltage of the other polarities.

5. A motor as claimed in claim 3 in which the commutating means has two portions, one of which provides a commutating voltage with a polarity.

6. A motor as claimed in claim 3 in which each main winding is connected at one end through one of the half of the main thyristors to the positive side of the supply and at the other end through one of the remainder of the main thyristors to the negative side of the supply.

7. A motor as claimed in claim 3 in which all the main windings have one end connected together to a central point of the supply, and half are connected at their other ends through one of the said half of the main thyristors to the positive side of the supply, whether the others are connected at their other ends through one of the said remainder of the main thyristors to the negative side of the supply.

8. A motor as claimed in claim 2 in which the timing means is arranged to cause the motor to operate in different modes over different parts of the speed range 9. A multi-phase switched variable reluctance motor having a number of phase windings each connected in series with at least one main thyristor across a D.C. supply, commutating means arranged to commutate the various thyristors, at least one free-wheeling thyristor connected in circuit with the phase winding and timing means responsive to the current in the different windings and/or in response to the angular position of the rotor arranged during a part of a rotor revolution in which a rotor pole passes a stator pole, to provide signals to fire at least one main thyristor to cause the phase winding on that stator pole to draw current from the supply; then to commutate at least one main thyristor; then to fire a free-wheeling thyristor to cause the current in that phase winding to free-wheel with no energy flowing to or from the supply; and then to commutate one of a second main thyristor and the free-wheeling thyristor to cause the current in that phase winding to flow to return energy to the supply.

10. A motor as claimed in claim 1 or claim 9 further including means responsive to motor speed arranged to control the timing means in dependence on the part of the total speed range of the motor in which the actual motor speed falls.

* * * * *